United States Patent
Chen et al.

(10) Patent No.: US 8,607,182 B2
(45) Date of Patent: Dec. 10, 2013

(54) METHOD OF FAST ANALOG LAYOUT MIGRATION

(75) Inventors: Tung-Chieh Chen, Taipei (TW); Hung-Ming Chen, Jhubei (TW); Yi-Peng Weng, Taipei (TW)

(73) Assignees: Synopsys Taiwan Co., Ltd., Taipei (TW); Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/476,027

(22) Filed: May 21, 2012

(65) Prior Publication Data

US 2012/0304139 A1 Nov. 29, 2012

Related U.S. Application Data

(60) Provisional application No. 61/489,269, filed on May 24, 2011.

(51) Int. Cl.
*G06F 17/50* (2006.01)

(52) U.S. Cl.
USPC ........... 716/119; 716/102; 716/103; 716/111; 716/132; 716/139

(58) Field of Classification Search
USPC ......... 716/101, 102, 103, 104, 105, 106, 107, 716/132–135, 139, 119
See application file for complete search history.

(56) References Cited

U.S. PATENT DOCUMENTS

| | | | | |
|---|---|---|---|---|
| 6,505,327 | B2 * | 1/2003 | Lin | 716/52 |
| 8,341,564 | B1 * | 12/2012 | Fales | 716/103 |
| 2006/0143589 | A1 * | 6/2006 | Horng et al. | 716/19 |
| 2008/0134109 | A1 * | 6/2008 | Hammouda et al. | 716/3 |
| 2010/0153892 | A1 * | 6/2010 | Gray et al. | 716/2 |
| 2011/0161907 | A1 * | 6/2011 | Cheng et al. | 716/119 |
| 2011/0265055 | A1 * | 10/2011 | Gray et al. | 716/119 |
| 2012/0233576 | A1 * | 9/2012 | Barrows et al. | 716/103 |

* cited by examiner

*Primary Examiner* — Nha Nguyen
(74) *Attorney, Agent, or Firm* — Kilpatrick Townsend and Stockton LLP

(57) ABSTRACT

A method of fast analog layout migration from an original layout is disclosed. Various placement constraints, including topology, matching and symmetry are extracted from the schematic or netlist as well as the original layout. In addition, relative placement patterns are extracted from the original layout for matching and symmetry constraints. A constraint hierarchy tree can be built according to the constraints, and relative placement patterns are attached accordingly. By using the constraint hierarchy tree, multiple new placement results are efficiently explored that preserve the relative placement patterns for matching and symmetry constraints.

5 Claims, 16 Drawing Sheets

FIG. 6C

METHOD OF FAST ANALOG LAYOUT MIGRATION

CROSS REFERENCE TO RELATED APPLICATIONS

This application claims the benefit of priority of U.S. Provisional Application No. 61/489,269, filed May 24, 2011, and titled "Constraint Hierarchy Driven Automatic IC Placement", the contents of which are herein incorporated by reference in its entirety.

This application is related to U.S. application Ser. No. 13/349,584, filed Jan. 13, 2012, and titled "Method of Constraint-Hierarchy-Driven IC Placement", which claims the benefit of priority of the above-mentioned U.S. Provisional Application No. 61/489,269.

BACKGROUND OF THE INVENTION

1. Field of the Invention

The present invention relates to an analog layout migration methodology for quickly providing multiple layouts for integrated circuit (IC), and more particularly, to a method for providing analog layout results with different aspect ratios while keeping similar or better circuit performance of the original layout.

2. Description of the Prior Art

In modern integrated circuit (IC) industry, analog ICs become more and more important. An analog IC is described by a netlist which includes a set of interconnected device modules such as transistors, capacitors, resisters and other devices. The functionality and performance of the analog ICs are heavily influenced by the placement of the device modules of the circuits. A system-on-a-chip (SOC) design which integrates digital and analog circuits has revolutionized the semiconductor industry. As new process technologies scale to smaller sizes, when a design is retargeted to the new process, reusing an existing layout as much as possible instead of redesigning a new one from the scratch becomes important to meet aggressive time-to-market schedules.

In digital circuits, advancement in the computer-aided-design (CAD) tools and the cell-based methodology made significant progress for optimum reuse of existing digital design. On the contrary, CAD tools in analog circuits still require much manual intervention. Since analog performance is strongly sensitive to mismatches due to process variations, operating conditions and parasitics, some constraints (e.g., symmetry, building blocks) need to be satisfied for alleviating these effects. In most cases, analog designers rely on their past experience and expertise to achieve desired performance by manually redrawing layouts when a circuit migrates to the new process or retargets to a new specification. Such process is quite time consuming and tedious. Therefore, a methodology that can automatically incorporate designer's knowledge into layout migration process will be important to reduce the design and turn-around time.

On the other hand, in order to allow analog designers to utilize electronic design automation (EDA) tools more efficiently, process design kit (PDK) gradually plays an important role in the analog circuit design. Schematics are constructed by PDK symbols, and layouts will be composed of Parametric Cells (Pcells) of corresponding devices in the PDK. According to different parameters (e.g., width, length, finger number, etc.) of each device, Pcells can help generate layout instances with clean design-rule check for all devices. Hierarchical relationship between devices and layout construction will be easier to keep and modify in the future.

Several approaches reported in the literature have focused on this issue. As a circuit is retargeted to a new technology or new specification, additional considerations should be addressed as well. The new result with exactly the same topology may not be the desired placement in the migrated technology because of the layout dimension or the layout area. Most of the layout-migration algorithms are based on layout compaction, since it closely resembles the source layout and automatically constructs a symbolic structural template to preserve layout topology, design rules, symmetry and matching information from an existing layout. The new device sizes will be imposed on the template during migration. Then this template can be solved by the set of constraints with linear programming (LP) or graph based algorithm to minimize layout area. The number of constraints and variables with LP affects the total runtime of layout migration. As layout becomes complicated, it becomes very time-consuming.

As a result, layout compaction is not a good approach since it just shrinks the chip size according to new device dimensions without considering any other optimized layout solutions. In addition, layout compaction does not provide sufficient flexibility for designers to modify layouts for other objectives as well.

Therefore, what is needed is a systematic approach to migrate an existing layout to a new technology to generate optimized layouts for the new technology while satisfying all the constraints.

SUMMARY OF THE INVENTION

One object of the present invention is to generate multiple placements for a plurality of device modules within an analog integrated circuit (IC) subject to a set of constraints.

One embodiment in the present invention is to provide a method of fast analog layout migration from an original layout for generating at least one placement based on a new technology. The topology of an original layout is analyzed and a plurality of constraints are obtained. One possible placement result based on the new technology according to the constraints and the hierarchical groups of device modules can be generated.

A constraint hierarchy tree which comprises layout topology, proximity, symmetry and matching constraints can be built up from a plurality of hierarchical groups of device modules. In the tree, a root node represents the IC design; a plurality of nodes represents either the constraints or the device modules within the IC.

Based on the hierarchy tree, a bottom-to-top process can be executed to generate placements for each of the constraints at a node. In addition, a cost-function is defined based on the dimension of a placement; and each placement will be evaluated based on the cost function to prune some placements with higher cost. Moreover, placements can be further optimized by using a top-down process for wire length optimization.

Other objects, technical contents, features and advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein:

FIG. 6A-FIG. 6C show an example to explain the process of generating a placement using a bottom-to-top process;

DETAILED DESCRIPTION OF THE INVENTION

The detailed explanation of the present invention is described as following. The described preferred embodiments are presented for purposes of illustrations and description, and they are not intended to limit the scope of the present invention.

In this invention, a systematic and automatic methodology which can quickly produce multiple placement results based on a reference layout is described. These placement results can be viewed as initial solutions to allow designers to choose. First, a method of extracting relative placement pattern from the original layout placement and saving it into a constraint hierarchy tree is presented. Some important constraints such as symmetry or matching will be handled in the hierarchical construction. A relative placement pattern can be saved into a constraint tree node. Then, the new layout placement is generated by using the constraint tree to migrate an existing layout according to a new technology.

The methodology of the present invention has some features which are described hereafter. The placement result which is similar to the original layout can be kept, and the placement solutions with various objectives such as fixed-outline placement and min-area placement are also provided, wherein the fixed-outline placement has different aspect ratios for designers to choose in upper-level circuit integration and the min-area placement can list placement results in an increasing order based on area of the placement easily. In addition, total wire length of each layout, considering symmetry constraints, can be further optimized.

Figure 1:
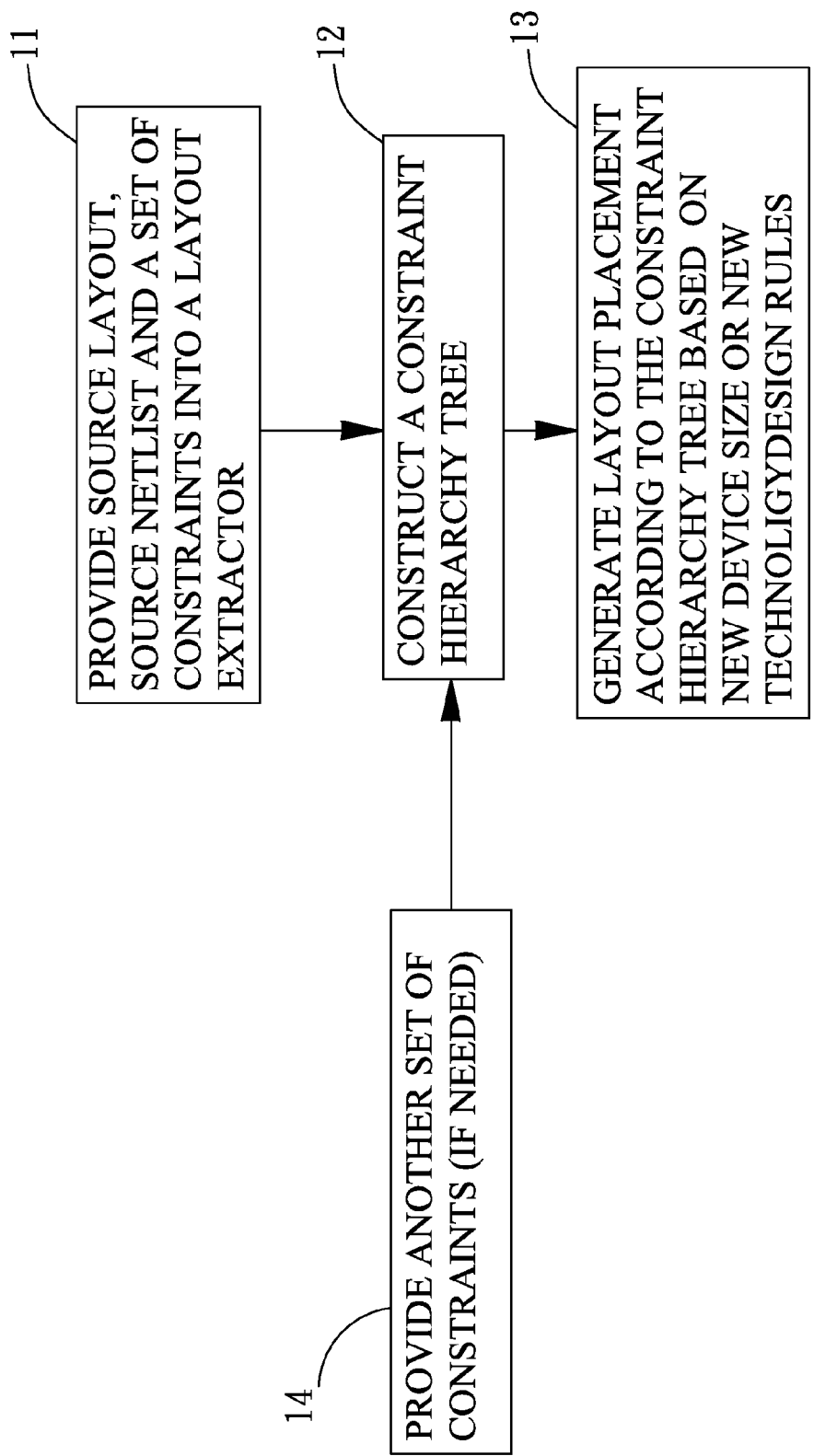
FIG. 1 illustrates the overall flow of analog layout migration.

The overall migration flow is illustrated in FIG. 1. An existing layout is pre-processed before going through the migration flow. The input to the layout extractor includes a pre-processed source layout, which comprises Pcells, a source netlist, and a set of constraints (step 11). The constraints such as symmetrical and device-matching can be generated from the circuit design of the existing layout automatically. In one embodiment, the layout extractor detects symmetry structure from the original layout for generating symmetry constraints and analyzes analog building blocks from the source netlist for generating matching constraints. It also analyzes the existing layout to extract relative placement patterns for each set of the device modules according to its corresponding constraint respectively.

In another embodiment, it further analyzes the existing layout to extract relative placement patterns among different sets of the device modules.

Then, the set of constraints are processed to form a constraint hierarchy tree comprising a root node, a plurality of internal nodes and a plurality of leaf nodes (step 12), wherein the root node represents the placement of the integrated circuit (IC), each of the internal nodes represents a constraint for its corresponding set of the device modules with the associated relative placement patterns respectively and each of the leaf nodes represents its corresponding device module respectively.

Please note that the relative placement patterns of the device modules of a constraint includes the relative placement pattern extracted from the existing layout as it is and/or other relative placement patterns explored according to the constraint, such as swapping two device modules without violating the constraint. However, when a constraint is a matching or symmetry constraint, the relative placement pattern extracted from the existing layout will be applied directly to generate the placement without exploring other patterns according to the constraint. On the other hand, when a constraint is not a matching or symmetry constraint, other relative placement patterns will be explored according to the constraint.

Furthermore, in one embodiment, the constraint hierarchy tree formed further comprises the associated relative placement patterns among different sets of the device modules.

In another embodiment, an additional set of constraints can be extracted by analyzing the existing layout which is not covered by the provided constraints at step 11, and the constraint hierarchy tree can be formed according to both the provided constraints and the additional set of constraints. In the other embodiment, another set of constraints, which are not covered by both the provided constraints and the additional set of constraints, can be inputted to the stage of constraint hierarchy tree construction (step 14), and the constraint hierarchy tree can be modified according to said another set of constraints. If there were some constraints conflict with the constraint hierarchy tree, they could be removed.

Finally, at least one placement for the integrated circuit (IC) is generated according to the constraint hierarchy tree based on the new technology, new devices sizes for new specification or new design rules (step 13). In one embodiment, another set of constraints can be selectively inputted to the stage of constraint hierarchy tree construction (step 14).

Figure 2A:
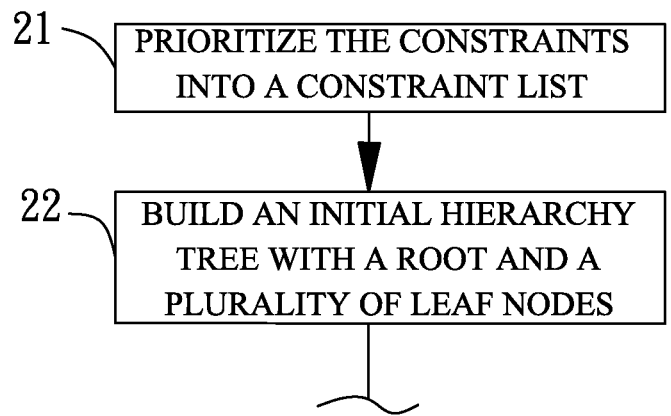
FIG. 2A and FIG. 2B illustrate a schematic flow diagram for creating a hierarchy tree.
Figure 2B:
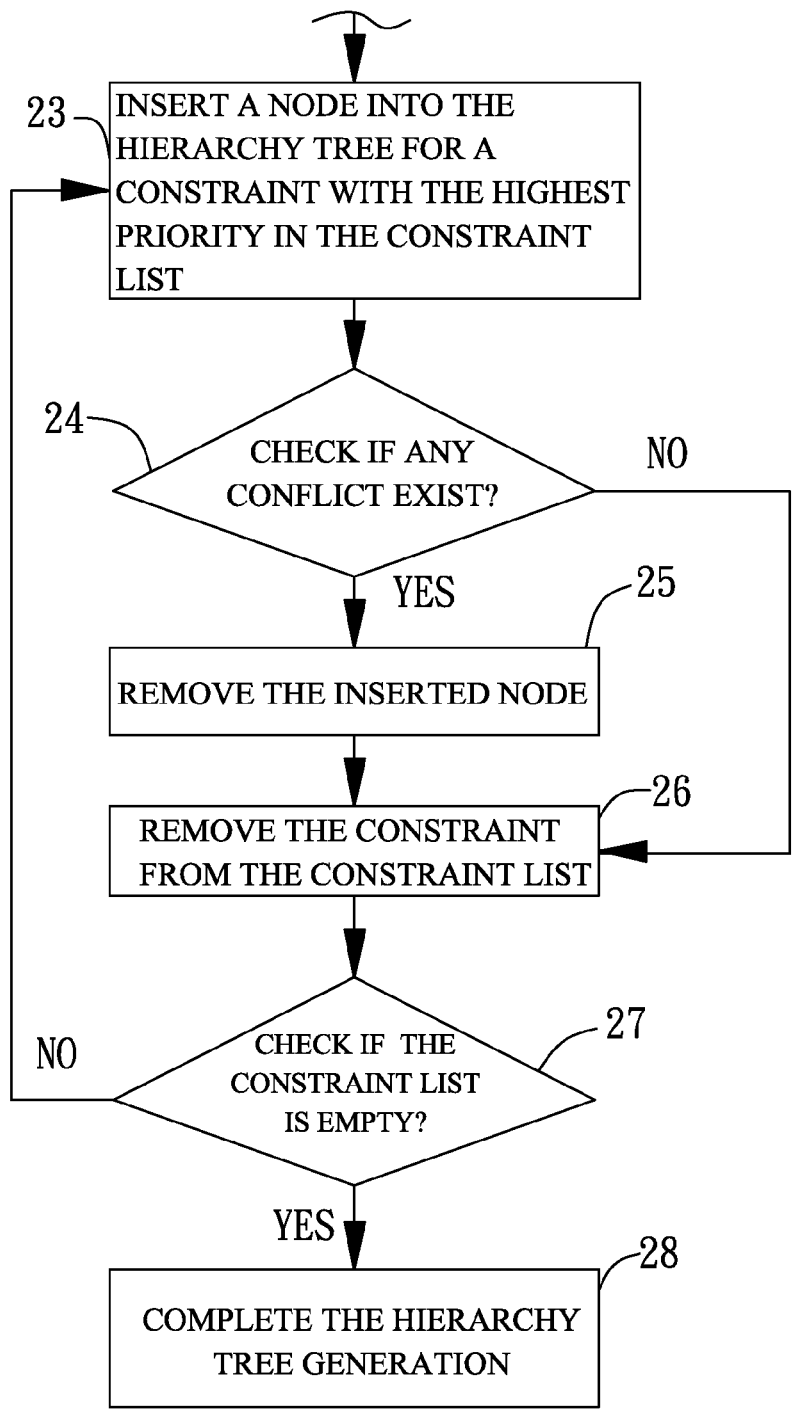

FIG. 2A and FIG. 2B show a schematic flow diagram which illustrates the details about the steps of building a hierarchy tree. In step 21, the constraints are prioritized and a list of constraints is formed according to their priorities. Please note that a constraint which covers a smaller scope typically gains a higher priority.

In step 22, according to the information in the netlist, an initial hierarchy tree is built. The initial hierarchy tree is a two-level tree which comprises a root node and a plurality of leaf nodes. The root node represents the IC design. Each of the leaf nodes represents one device module in the IC design.

Referring to step 23, a node associated with a constraint with the highest priority in the constraint list is inserted into the hierarchy tree. The node represents the constraint. Furthermore, corresponding attributes for the constraint can be recorded in the node. For example, if the constraint is a symmetry constraint, attributes such as symmetry pairs and symmetry axes are recorded. If the constraint is a matching constraint, a corresponding matching placement pattern is recorded as an attribute.

In addition, there is only a single route for each of the leaf node to reach the root node. A node is eventually inserted into the existing hierarchy tree when there is no conflict between the constraint of the node and the constraints already existing in the hierarchy tree. In other words, if more than one route is found for any one of the leaf nodes to reach the root node after a constraint node is inserted, there is a conflict between the just-inserted constraint and the other constraints currently in the hierarchy tree as shown in step 24. To resolve the conflict, the inserted node representing the constraint is removed as illustrated in step 25, in other words, the constraint is discarded (and may be reported to the user accordingly). In step 26, the constraint which has been processed is removed from the constraint list. Then, if the constraint list is not empty in step 27, a constraint with the highest priority in current constraint list will be processed by repeating step 23 to step 27. If the constraint list is empty, the hierarchy tree construction is completed (step 28) and ready for placement generation.

FIG. 3A-3E illustrate an example of hierarchy tree generation. An IC design comprises device modules D1, D2, D3, D4, D5, D6 and D7, and four constraints are provided. The first constraint is a symmetry constraint (denoted as S0) which D5, D6 and D7 are subject to, which means the constraint S0 has a set of device modules which consist of D5, D6 and D7, i.e. constraint S0 is applied to device modules D5, D6 and D7; the second constraint is a cluster constraint (denoted as C0) which D1 and D2 are subject to, which means the constraint C0 has a set of device modules which consist of D1 and D2; the third constraint is a cluster constraint (denoted as C1) which D3 and D4 are subject to; and the fourth constraint is a cluster constraint (denoted as C2) which D4 and D5 are subject to.

Figure 3A:
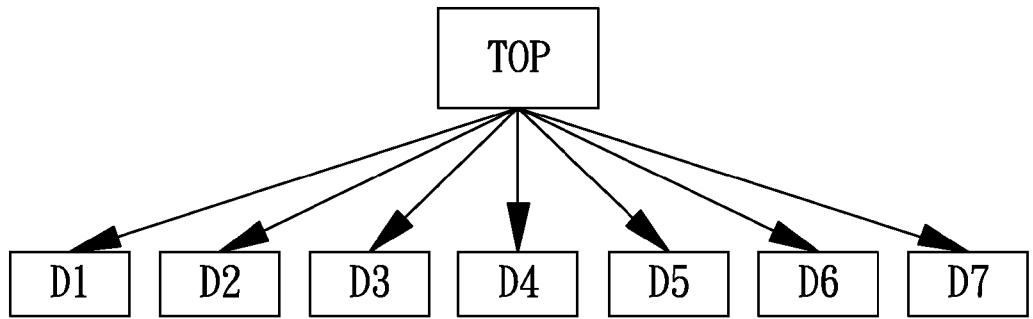
FIG. 3A-FIG. 3H show examples to explain the process of hierarchy tree creation.

In order to build the hierarchy tree with constraints, a two-level hierarchy tree is initiated as shown in FIG. 3A, in which a root node is denoted as "TOP" and seven leaf nodes are created for device modules D1-D7; and the constraints are prioritized in the order of S0, C0, C1 and C2.

Figure 3B:
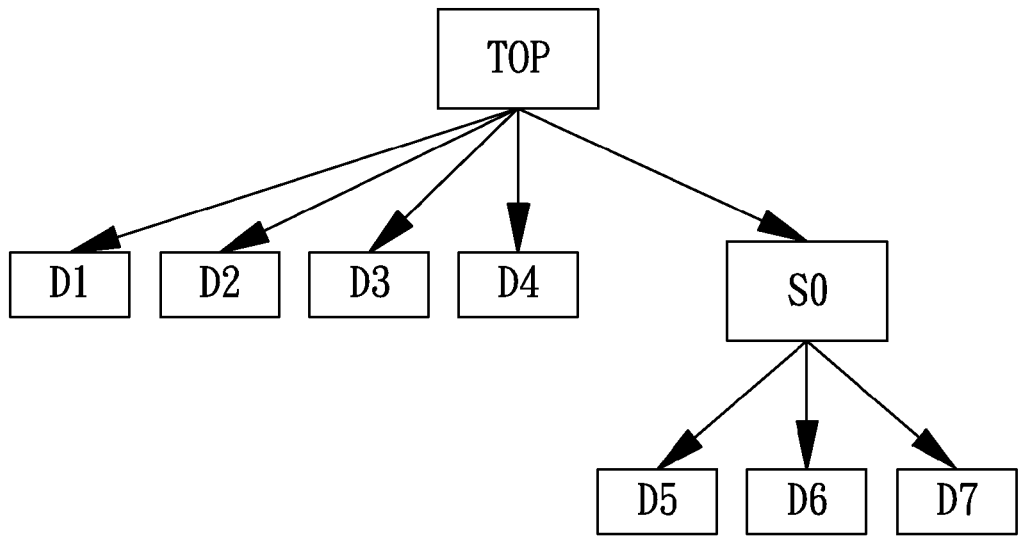
Figure 3C:
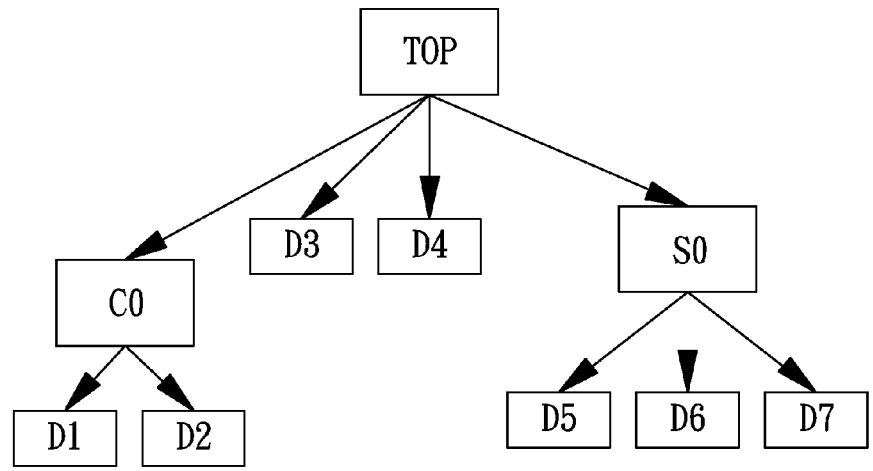
Figure 3D:
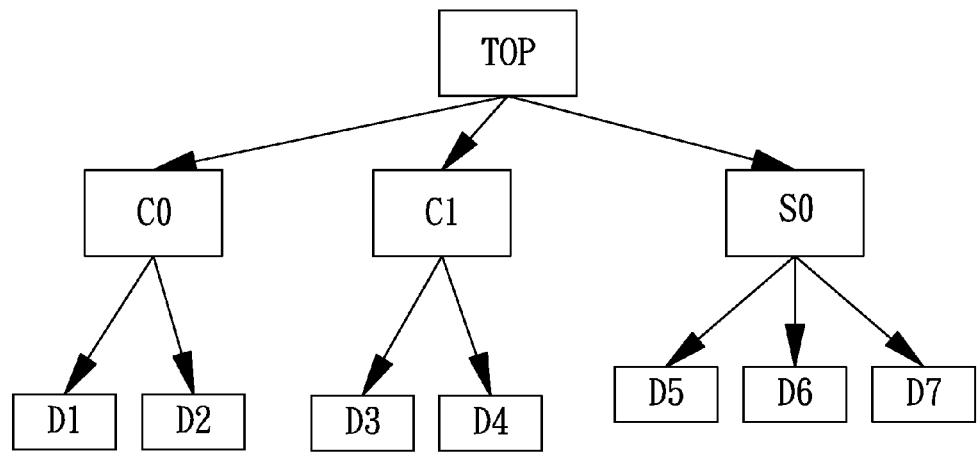

As shown in FIG. 3B, a node "S0" is inserted according to the constraint S0. For a symmetry constraint, some attributes, such as symmetry pairs and symmetry axes, are recorded and associated with the corresponding node. Then, as shown in FIG. 3C, a node "C0" is inserted according to the constraint C0, and no conflict is detected. Next, a node "C1" is inserted according to the constraint C1 as shown in FIG. 3D, and no conflict is detected either.

Figure 3E:
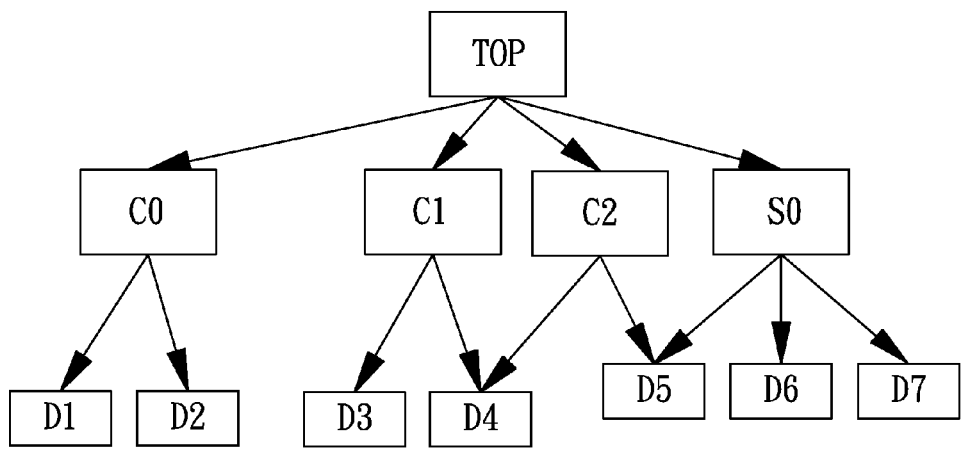

Finally, as shown in FIG. 3E, a node "C2" is inserted according to the constraint C2. However, two routes can be found from leaf node D4 to reach the root node; and the same situation applies to leaf node D5 as well, which means the C2 constraint conflicts with the existing constraints and thus should be removed; and the hierarchy tree should be remained as it is in FIG. 3D.

After executing the above steps, a hierarchy tree is built with three constraints, S0, C0 and C1, without any conflict, and the other constraint, C2, is discarded.

Figure 3F:
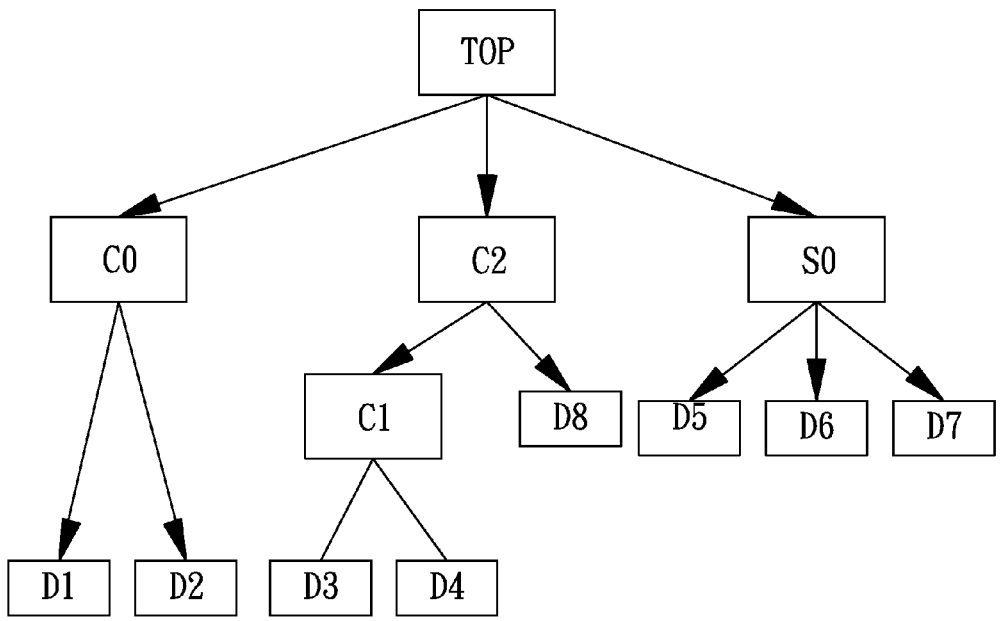
Figure 3G:
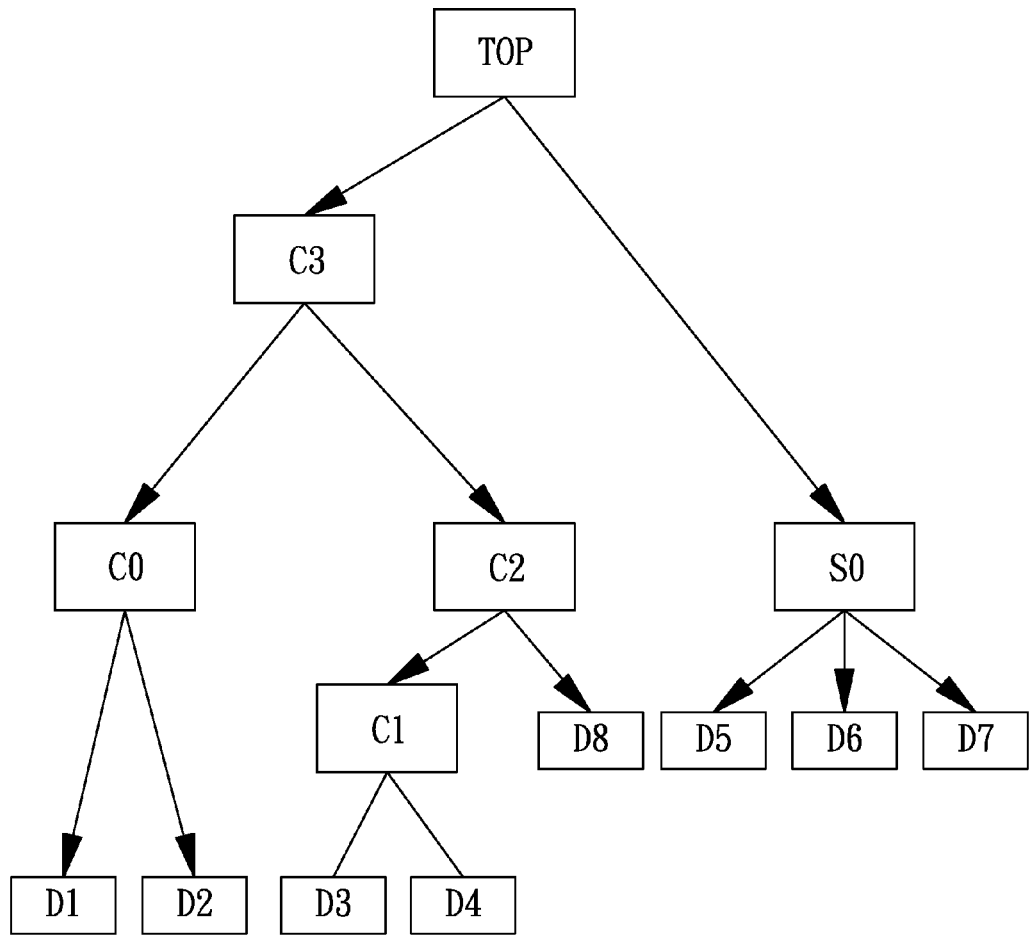
Figure 3H:
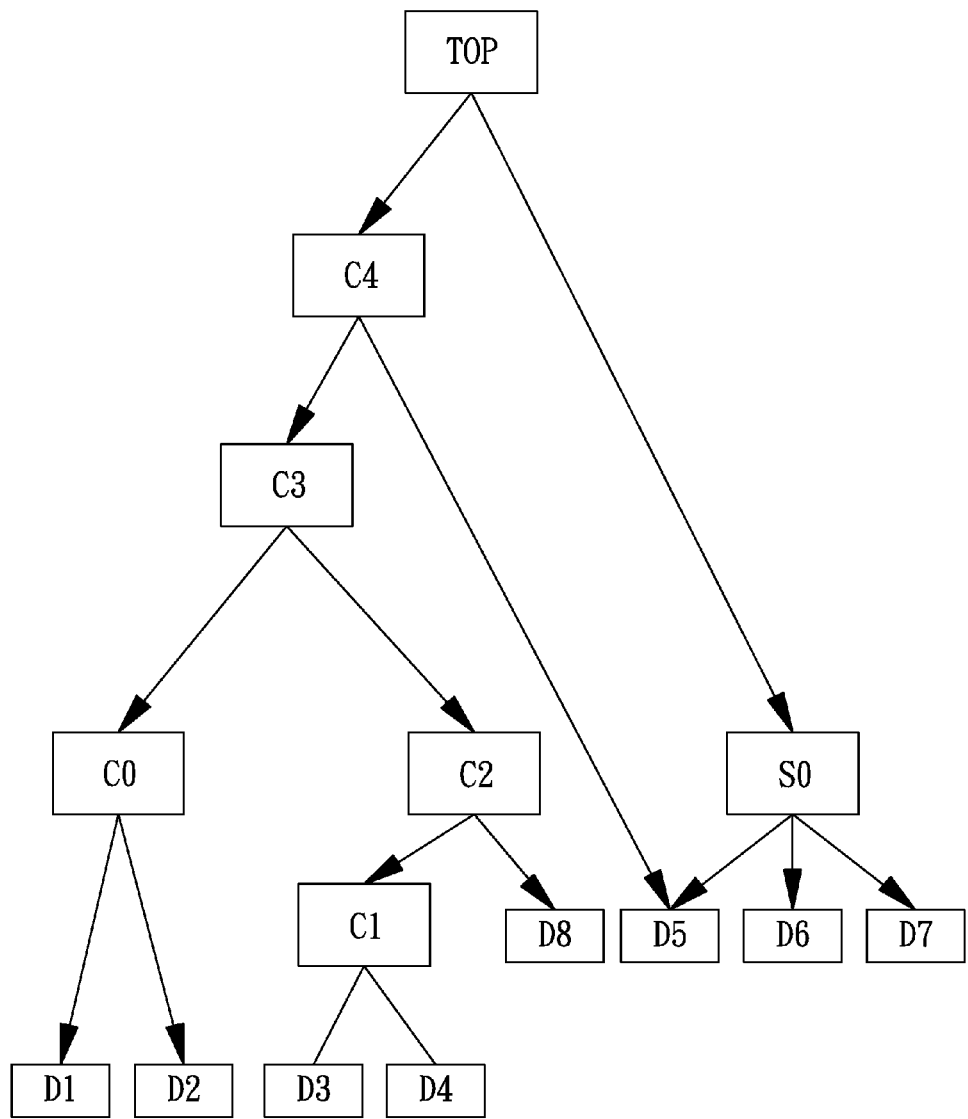

Please continue to refer to FIG. 3F to FIG. 3H which depict an example for multi-level constraints. An IC design comprises device modules D1, D2, D3, D4, D5, D6, D7 and D8, and six constraints are provided for generating placements. The first constraint is a symmetry constraint (denoted as S0) which D5, D6 and D7 are subject to; the second constraint is a cluster constraint (denoted as C0) which D1 and D2 are subject to; the third constraint is a cluster constraint (denoted as C1) which D3 and D4 are subject to; the fourth constraint is a cluster constraint (denoted as C2) which C1 and D8 are subject to; the fifth constraint is a cluster constraint (denoted as C3) which C0 and C2 are subject to; and the sixth constraint is a cluster constraint (denoted as C4) which C3 and D5 are subject to. In addition, the constraints are prioritized in the order of S0, C0, C1, C2, C3 and C4.

After applying the same steps as in FIG. 3A to FIG. 3D for S0, C0, and C1, a node for constraint C2 can be inserted in a similar way as shown in FIG. 3F, wherein the child nodes of C2 are C1 and D8. Next, a node for constraint C3 is further inserted as illustrated in FIG. 3G, wherein the child nodes of C3 are C0 and C2. Finally, a node for constraint C4 is inserted as in FIG. 3H, where a conflict can be found. Thus, the constraint C4 should be discarded.

From the examples demonstrated in FIG. 3A to FIG. 3H, it is concluded that there are two ways to detect conflicts among constraints. The first way is to check if more than one route can be found for any leaf node to reach the root node. As shown in FIG. 3E, device module D4 has two routes to reach the root node, which indicates a conflict.

The second way is to check if two constraints have a common set of device modules, wherein the common set of device modules is not equal to the set of device modules of one of the two constraints, and the common set of device modules is not equal to the set of device modules of the other of the two constraints. Referring to FIG. 3E again to compare the device modules of C1 and C2, there is a common device module D4 between C1 and C2. Furthermore, D4 is not equal to the set formed by D3 and D4; D4 is not equal to the set formed by D4 and D5, either. By using this way, a conflict can be detected as well.

Figure 4:
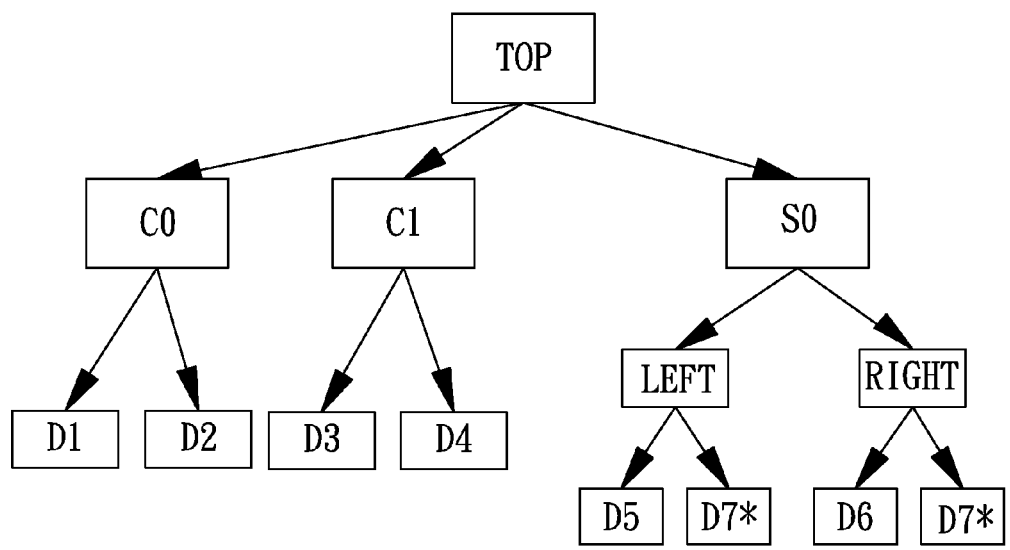
FIG. 4 shows one embodiment to represent a symmetry constraint when creating a hierarchy tree.

Regarding representing a symmetry constraint in the hierarchy tree, in one embodiment, two additional nodes can be inserted under the node representing the constraint to create symmetrical sub-groups for the corresponding device modules. Please refer to FIG. 4 which illustrates the presentation for the example mentioned in FIG. 3A-3E. Under the node S0, two nodes, "LEFT" and "RIGHT", are inserted to indicate that the corresponding device modules are placed symmetrically with respect to a vertical axis. Furthermore, D5 and D7* are arranged under node "LEFT" and D6 and D7* are arranged under node "RIGHT", which means D5 and D6 are symmetric with respect to the vertical axis and D7 is self-symmetric with respect to the vertical axis.

Additionally, based on the nature of constraints, some constraints do not affect the structure of the hierarchy tree. In other words, it is not necessary to insert a node for those constraints, and these constraints will be treated as attributes when generating placements. Therefore, the above-mentioned constraints should be recorded in the nodes of the hierarchy tree for placement generation. For example, given an alignment constraint which is applied to a set of device modules which are subject to a cluster constraint, the alignment property will be recorded in the node which represents the cluster constraint. Another example is that, given a clearance constraint which is applied to a set of device modules which are subject to a cluster constraint, the clearance range will be recorded in the node which represents the cluster constraint. The above-mentioned constraints which do not affect the structure of the hierarchy tree will be referenced when generating placements.

In one embodiment, if users need to refine constraints, it can be done by inserting, moving, or removing related nodes for the corresponding constraints on the constraint hierarchy tree directly. A graphical user interface may be used to display the tree, and the user can edit the tree visually and interactively. The edited tree can be used to produce a new list of constraints to save on disk. Through this systematic way, we can ensure that the refinement will not introduce any conflicts.

Bottom-to-Top Placement Generation

Figure 5:
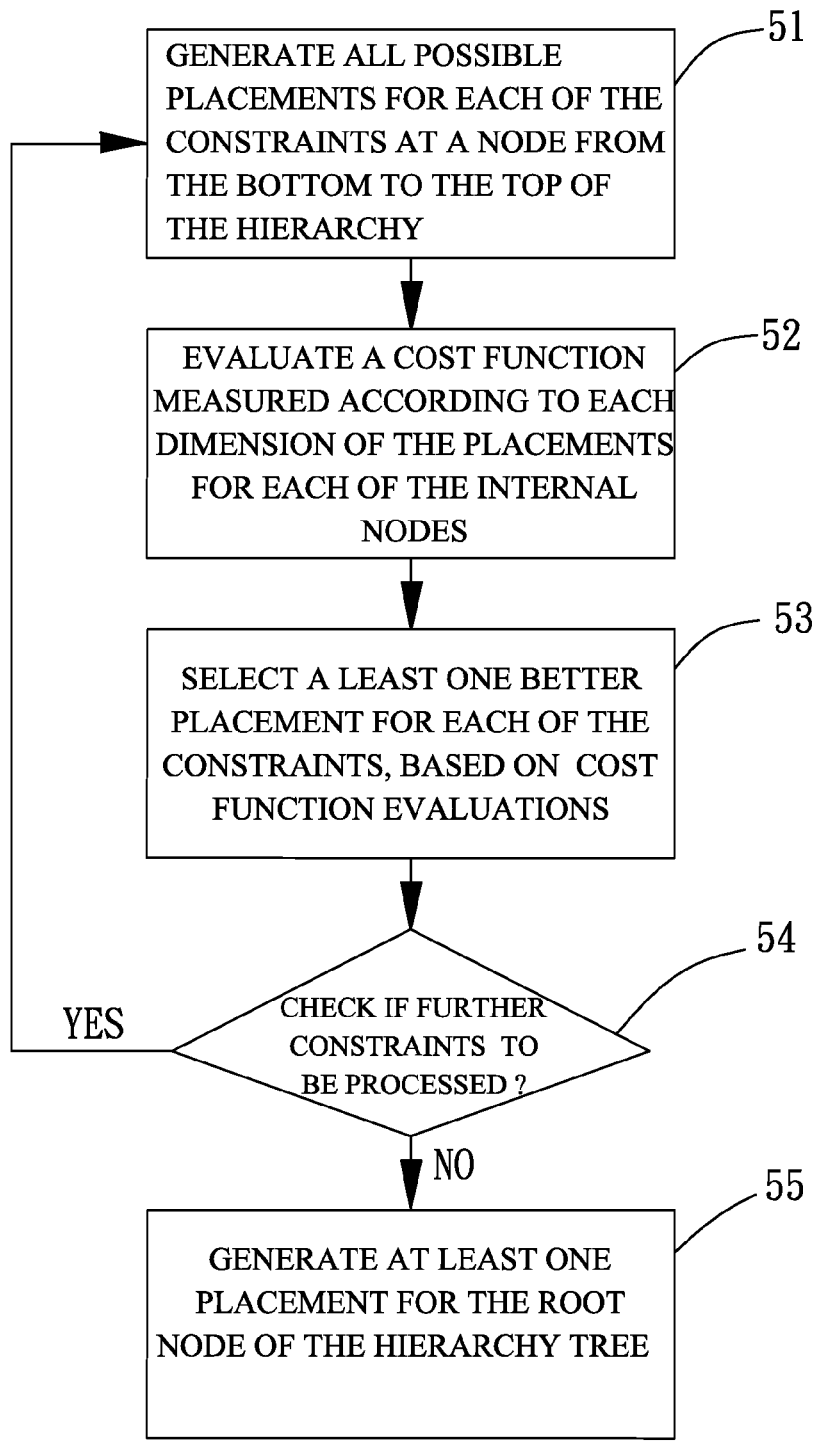
FIG. 5 illustrates a schematic flow diagram for bottom-to-top placement generation process.

For an IC design, typically at least one set of width and height dimensions is defined for each of the device modules, and a cost function can be used to measure a placement quality according to the dimensions of the device modules. Please refer to FIG. 5 which further depicts a detailed flow diagram for placement generation based on a hierarchy tree for the IC design.

First, all possible placements are generated for each of the nodes which represent constraints from the bottom to the top of the hierarchy tree (step 51).

Next, a cost function is evaluated for each placement associated with each of the constraints in step 52. Then, according to the cost function evaluations, at least one better placement can be chosen for each of the nodes in step 53. Thus, the number of possible placements in upper level of nodes can be reduced because some high-cost placements are pruned. As a result, the runtime of the placement program can be reduced. After confirming that no further nodes to be processed in step 54, at least one placement for the root node can be generated by combining the placements of the root node's child nodes in step 55.

Note that any floorplanning method (such as simulated annealing, greedy algorithm, etc.) and any floorplanning representation (such as sequence pair, B*-tree, transitive closure graph (TCG), etc.) can be used at step 51 and 55 as long as it can generate placement results. The details are not described herein.

Figure 6A:
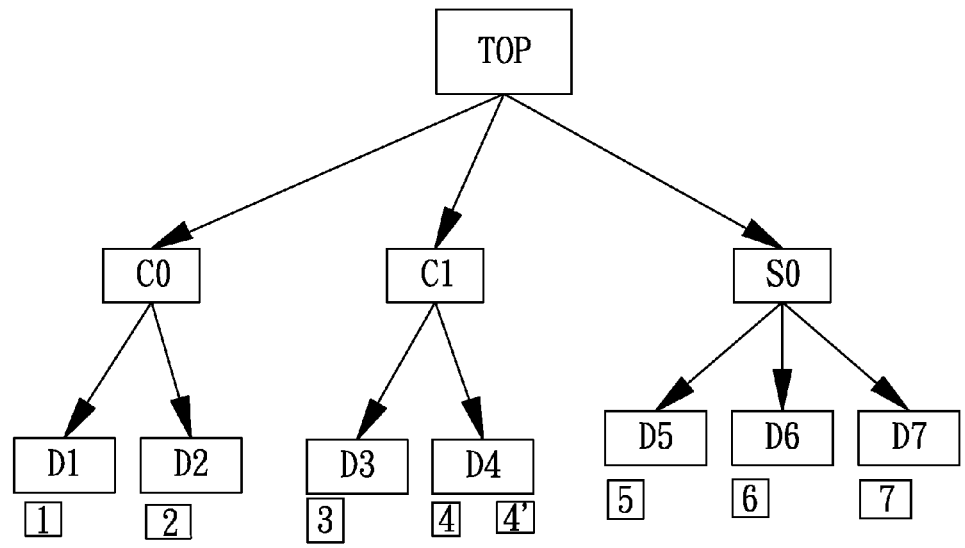
Figure 6B:
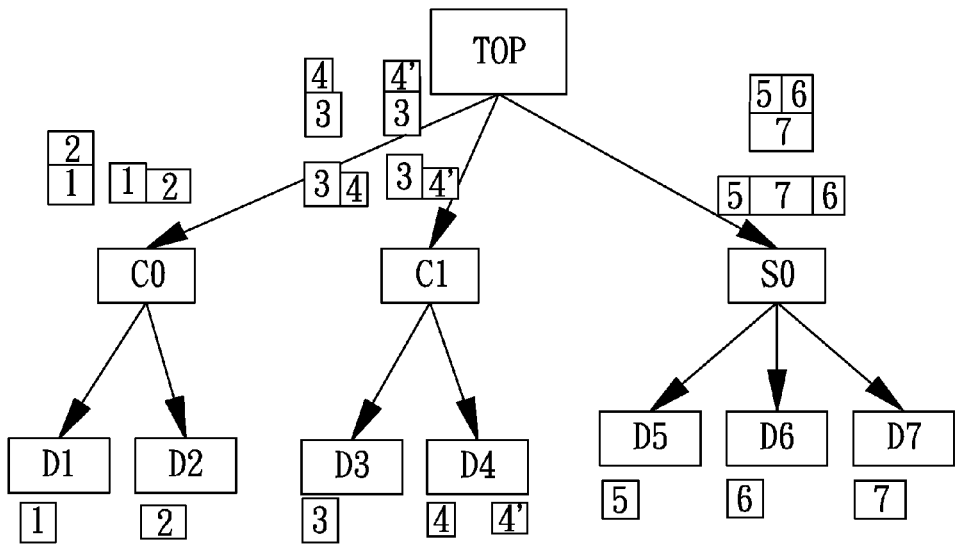
Figure 6C:
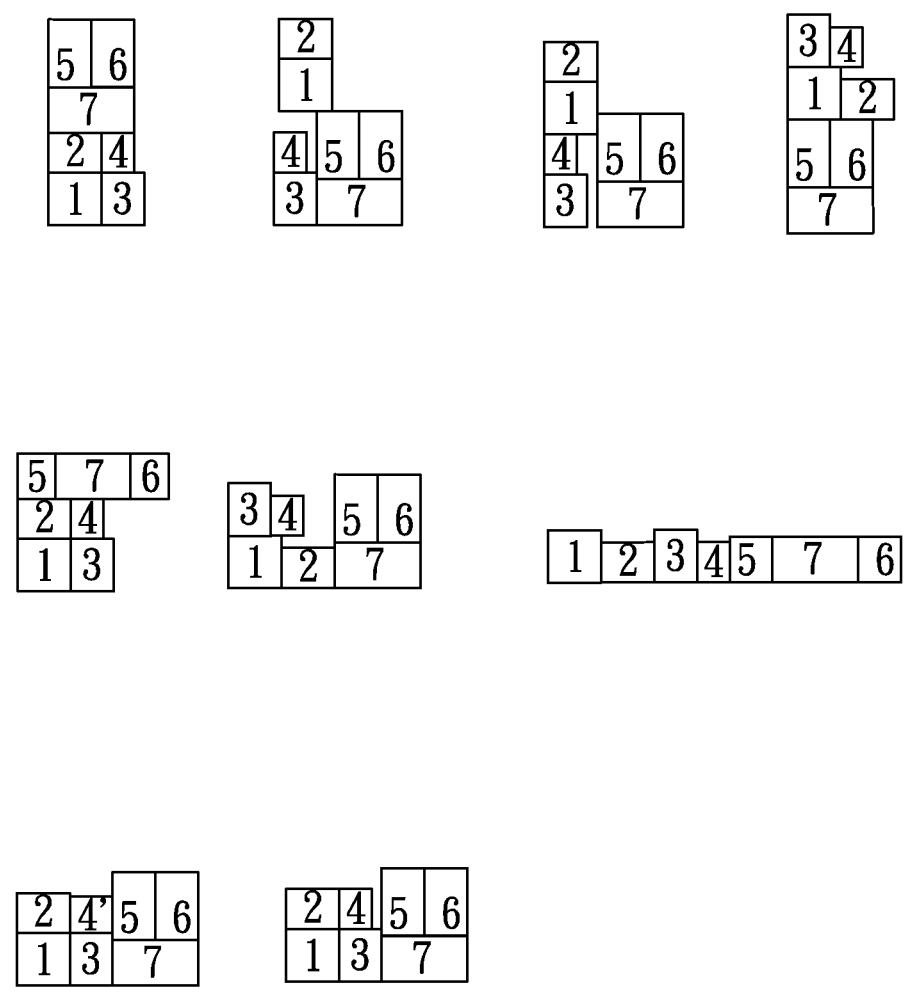

FIG. 6A-6C illustrate an example of bottom-to-top placement generation according to a built constraint hierarchy tree. In FIG. 6A, dimensions are defined for each of the device modules which are represented by the leaf nodes. Note that two possible dimensions are recorded for device module D4. Next, all possible placements for C0 and C1 are generated and recorded in the corresponding nodes. All possible placements for S0 are also generated and recorded in the corresponding nodes according to the symmetry attributes. FIG. 6B shows some of the possible placements for C0, C1 and S0. Finally, all possible placements are generated according the placements which are generated for C0, C1 and S0. Note that only some of the possible placements for the root node are shown in FIG. 6C.

Top-Down Wire Length Optimization

Although dimension optimization is done for the placements through the bottom-to-top process as described above, placements with the same dimension may have different total wire lengths. Thus, we can further optimize total wire length by using a top-down approach while keeping a placement dimension the same or even smaller.

Figure 7A:
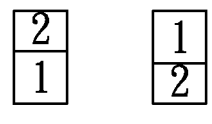
FIG. 7A-FIG. 7D show an example to explain the process of top-down wire length optimization.

Based on the example mentioned above, FIG. 7A shows the result of rearranging one of the placements of the root node while keeping dimensions the same. Then, at least one placement can be chosen with the smallest wire length.

Figures 7B, 7C:
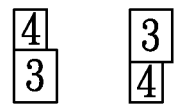
Figure 7D:
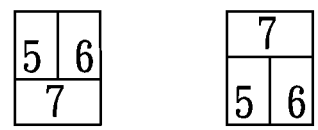

The similar step can be performed for each of the constraints from the top to the bottom of the hierarchy tree. FIG. 7B-7D show some placements for wire length optimization. As a result, at least one placement with a smallest wire length can be selected from the placements to optimize the wire length for each of the nodes in the hierarchy tree by using the top-down process.

It is to be noted that during the top-down process for wire length optimization, the "current best" placement for the root note is always used for calculating the differences caused by various placements within the current node. After the placement with smallest total wire length is chosen for the current node, the "current best" placement for the root node is updated accordingly. Then, the process moves on to the next node in the hierarchy, and the optimization process continues.

One Layout Migration Embodiment of the Present Invention

Figure 8:
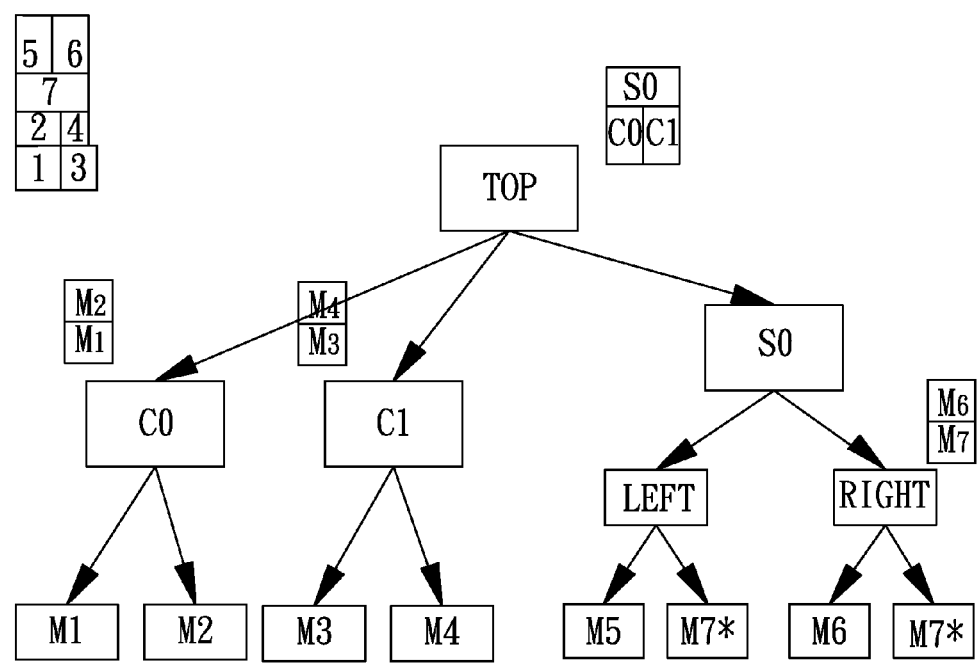
FIG. 8 illustrates an original layout and its constraint tree.

FIG. 8 illustrates an original layout and its extracted constraint tree. An IC design, comprising device modules M1, M2, M3, M4, M5, M6 and M7, and three constraints are provided for generating placements. The first constraint is a symmetry constraint (denoted as S0) which M5, M6 and M7 are subject to; the second constraint is a cluster constraint (denoted as C0) which M1 and M2 are subject to; the third constraint is a cluster constraint (denoted as C1) which M3 and M4 are subject to. In this tree, a root node is denoted as "TOP" and seven leaf nodes are created for device modules M1-M7; and the constraints are prioritized in the order of S0, C0, and C1. Under the node S0, two nodes, "LEFT" and "RIGHT", are inserted to indicate that the corresponding device modules are placed symmetrically with respect to a vertical axis. Furthermore, M5 and M7* are arranged under node "LEFT" and M6 and M7* are arranged under node "RIGHT", which means M5 and M6 are symmetric with respect to the vertical axis and M7 is self-symmetric with respect to the vertical axis.

Figure 9:
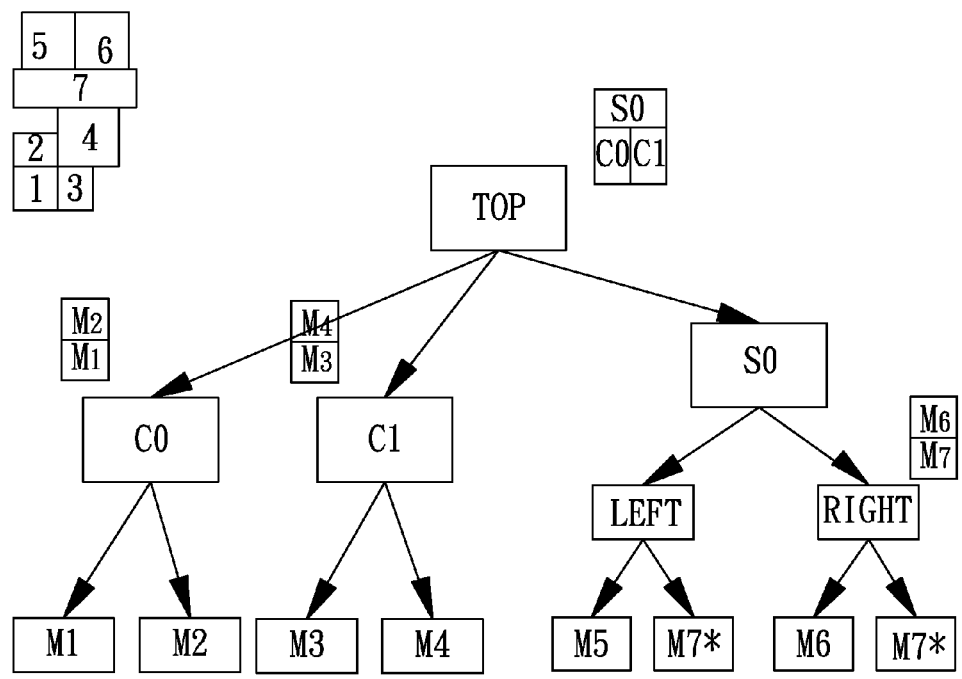
FIG. 9 illustrates generating a new layout using the original constraint tree.

Next, a new placement of new layout device dimensions is generated by using the original constraint tree illustrated in FIG. 9. The constraint tree of the new layout device dimension is the same as the original one, only the size and position of device modules are somewhat different.

Figure 10:
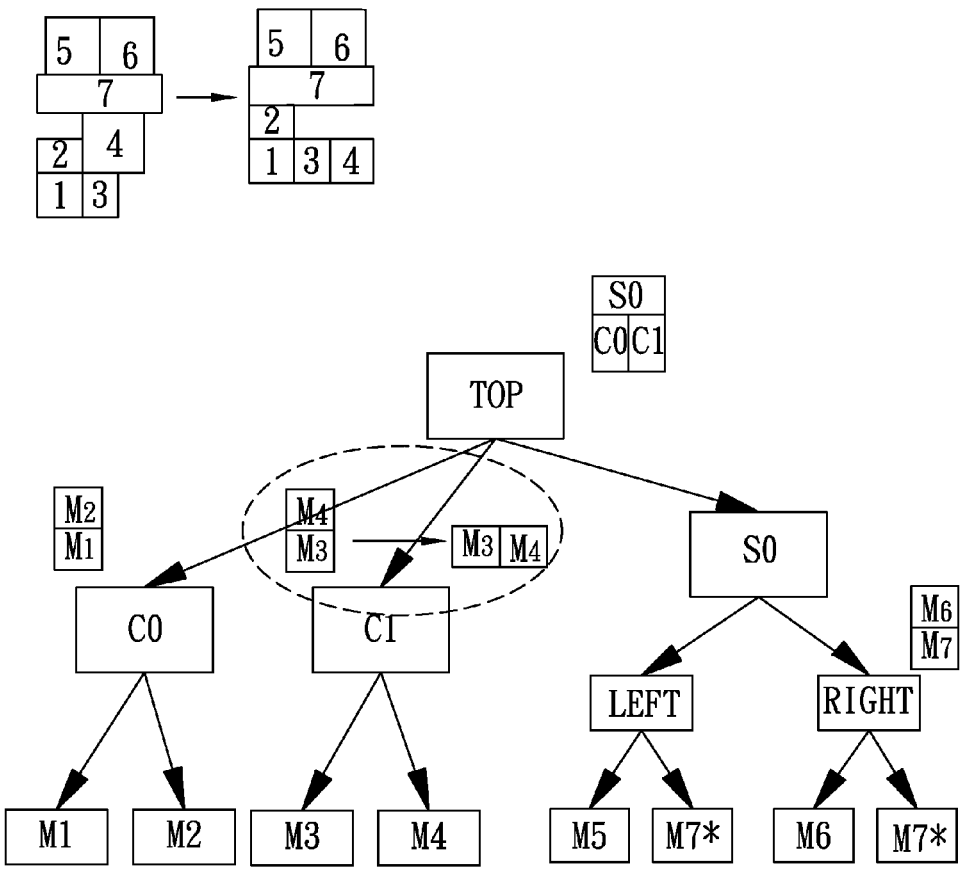
FIG. 10 illustrates an optimization of the new generated layout.

Once the generated layout is obtained, it can still be improved by incremental modification to further optimize the area/wire length. FIG. 10 illustrates an optimization of the new generated layout in FIG. 9. The placement pattern can be slightly modified to reduce the area/wire length. For example, it can change C1 pattern from vertical to horizontal to make the resulting placement more compact.

In summary, the invention provides a systematic way to complete fast layout migration. A relative placement pattern can be extracted from an original layout and saved into constraint hierarchy tree. Once the hierarchy tree is built, a new placement for a new technology can be obtained efficiently.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the Claims appended hereto and their equivalents.

What is claimed is:

1. A method of layout migration for generating at least one placement for an integrated circuit (IC) based on a new technology, wherein the integrated circuit (IC) comprises a plurality of device modules, the method comprising the steps of:
   a. providing an existing layout;
   b. providing a first set of constraints according to the existing layout, wherein each of the constraints has a corresponding set of device modules subject to the constraint;
   c. analyzing the existing layout to generate at least one relative placement pattern for each set of the device modules according to its corresponding constraint of the first set of constraints respectively, wherein said at least one relative placement pattern comprises the relative placement pattern extracted from the existing layout;

d. forming, by using a computer, a constraint hierarchy tree comprising a root node, a plurality of internal nodes and a plurality of leaf nodes according to the first set of constraints, wherein the root node represents the placement of the integrated circuit (IC), each of the internal nodes represents a constraint for its corresponding set of the device modules with the associated at least one relative placement pattern respectively and each of the leaf nodes represents its corresponding device module respectively; and e. generating at least one placement for the integrated circuit (IC) according to the constraint hierarchy tree based on the new technology, wherein at least one dimension is defined for each of the device modules and a cost function is defined to measure a placement quality according to the dimensions of the device modules, further comprising the sub-steps of:

e1. generating a plurality of placements that satisfy the constraint at a node if the constraint is not a matching or symmetry constraint; generating a placement according to the relative placement pattern extracted from the existing layout if the constraint is a matching or symmetry constraint; and e2. selecting a placement from the plurality of placements at the node according to the cost function if the constraint is not a matching or symmetry constraint.

2. The method according to claim 1, wherein step e further comprises recording said at least one placement in the node.

3. The method according to claim 1, further comprising the step of:

f. modifying said at least one placement to generate corresponding placements with smaller wire length for each of the constraints from the top to the bottom of the constraint hierarchy tree sequentially, wherein the dimension of the placements for each of the constraint does not increase.

4. The method according to claim 1, further comprising a step d1 after step d, wherein the step d1 comprises editing the constraints in the hierarchy tree interactively.

5. The method according to claim 4, wherein said editing includes inserting, moving, or removing nodes in the hierarchy tree.

* * * * *